2,949,371

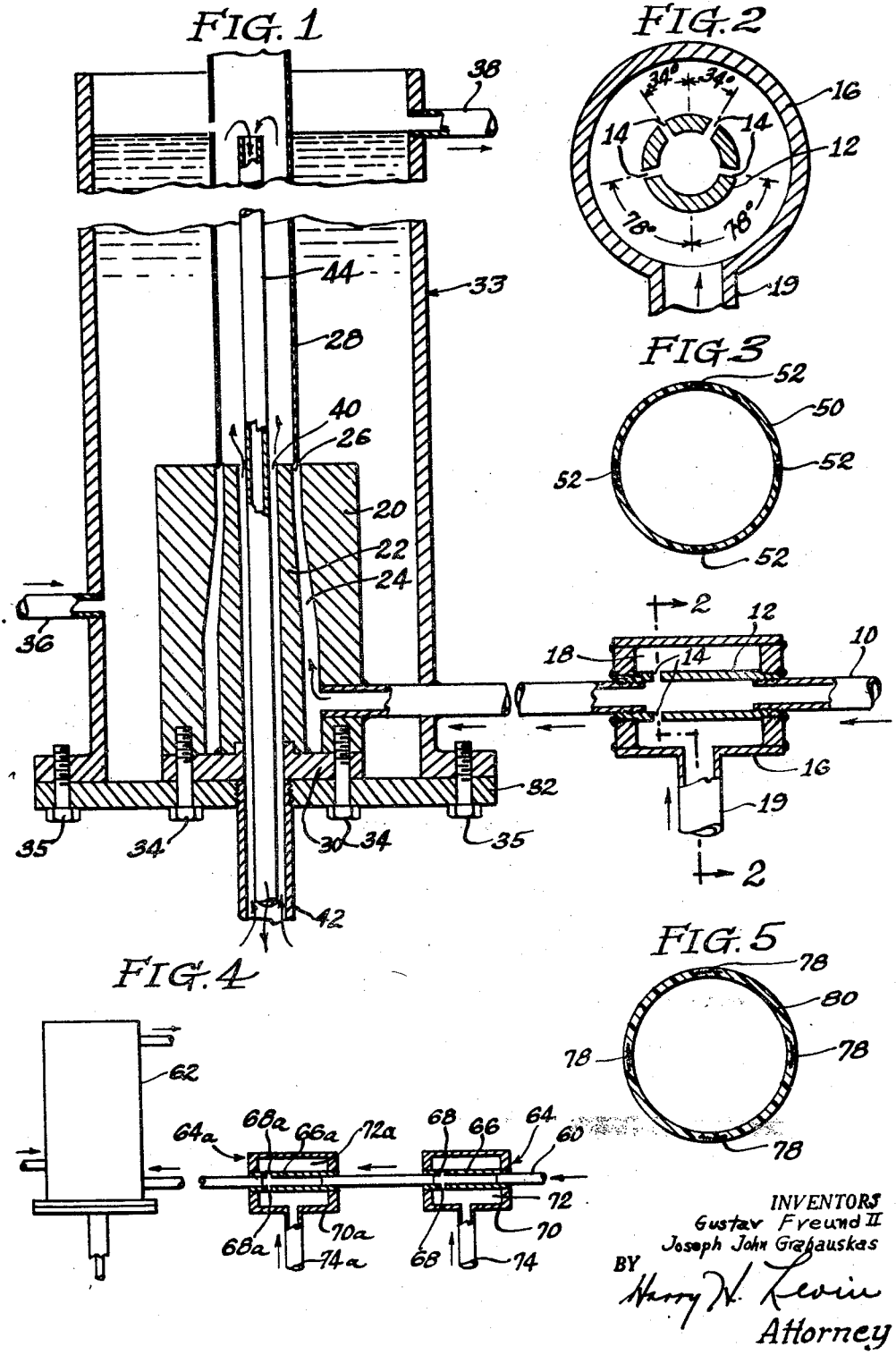

CASINGS, METHOD OF, AND APPARATUS FOR PRODUCING SAME

Gustav Freund II, Highland Park, and Joseph John Grabauskas, Chicago, Ill., assignors, by mesne assignments, to Union Carbide Corporation, New York, N.Y., a corporation of New York Filed Dec. 27, 1955, Ser. No. 555,670

16 Claims. (Cl. 99—176)

This invention relates to the sausage casing art. More particularly, it relates to a sausage casing whose presence on a frankfurter can be readily detected, as well as the method of and apparatus for making the same.

In the production of skinless frankfurters, a transparent cellulosic casing, such as produced by the viscose process, is stuffed with a sausage meat emulsion and the stuffed casing is successively linked, cured as by smoking, cooked, chilled, and finally the casing is peeled from the individual frankfurters. The individual frankfurters are then packaged and shipped.

The peeling operation is generally performed mechanically by automatic peeling machines. In these machines, the frankfurters, after passing thru the zone of action of the peeling operation are conveyed by a belt to a collection device, or to a station where the frankfurters are packaged for shipment. Though such peeling machines are highly efficient, nevertheless, they do not peel the casings from all the frankfurters on which they operate. Since the encased frankfurters and the skinless frankfurters are very similar in appearance, acute visual perception is required to separate the encased frankfurters from the skinless frankfurters.

Attempts have been made to mark the sausage casings so that their presence on frankfurters could be readily detected. However, for such marking, a separate operation was necessary and in many cases, the markings interfered with the processing of the frankfurters to such an extent that when the casings were peeled, the resulting skinless frankfurters did not have a uniform surface coloration which is desired for a satisfactory product.

An object of this invention is to provide a new and improved sausage casing.

Another object of this invention is to provide a cellulosic sausage casing whose presence on a frankfurter can be readily detected.

An additional object of this invention is to provide a method of and apparatus for producing permanently marked cellulosic sausage casings.

Other and additional objects of the invention will become apparent hereafter.

The above objects are accomplished in general by permanently incorporating on or in the outside surface of a cellulosic casing, a thin stripe or stripes extending throughout the length of the wall of the casing and formed of a regenerated cellulose having characteristics different and detectable from the regenerated cellulose, constituting the major portion of the casing. As will hereafter appear, the stripes are obtained by incorporating a striping viscose in or on the outside surface of a viscose mass and thereafter extruding the mass upwardly through an annular orifice into a coagulating and regenerating bath, whereby the striping viscose is coagulated and regenerated in situ and simultaneously with the tubular viscose mass, producing stripes which are intimately united without interfaces with the regenerated cellulose of the casing to form a unitary and integral product.

In one embodiment of the method for producing stripe casings, a clear viscose is fed through a supply line and upwardly through a nozzle having an annular or ice into a coagulating and regenerating bath and striping viscose in the form of an opaque viscose is fe through appropriately spaced orifices in the peripher wall of the clear viscose supply line to the clear visco flowing therethrough. By varying the rate of feed the opaque viscose to the supply line, the opaque vi cose can be applied as a surface coating or made penetrate the surface of the clear viscose as desired. Tl rate of feed, together with the size of the orifices, throug which the striping viscose is applied, determine the wid of the applied opaque viscose, which appear as opaq stripes in the product.

The viscose of the striping viscose and the clear vi cose are compatible and thus unite, without interface at their contacting surfaces, so that when the strip mass is coagulated and regenerated, the product is coherent regenerated cellulosic unit having opaq stripes.

It is not essential that the striping viscose be opaqu It can be a viscose which will yield optical or oth characteristics different from that of the viscose cons tuting the major portion of the product. Examples materials incorporated in the striping viscose which a suitable are pigments, particularly carbon black and tanium oxide, to form opaque stripes; dyes, to for colored stripes; scintillating materials, such as mica, form stripes of metallic appearance; fluorescent materia such as β-methyl umbelliferone, fluorescein and eryt rosin to form stripes which fluoresce under ultra-viol light; magnetic materials, such as iron and iron oxi powder to form stripes that can be detected by electron means; etc.; and mixtures of any of the foregoing wi each other.

In accordance with this invention, casings may be pr vided with one or more stripes. When a plurality stripes are desired, the arrangement of the orific through which the striping viscose is supplied depen on the desired location of the stripes in the product. general, when a plurality of substantially equidistant spaced stripes are desired, the striping viscose supp orifices are arranged and spaced to compensate for tl angular displacement of any of the stripes produc by the movement of the mass through the nozzle to tl point of extrusion.

The means for supplying the striping viscose can applied to any extrusion apparatus for producing cell losic tubing for use as sausage casing. In one embo ment, a tubular fitting having a sleeve containing o fices in its peripheral wall is inserted in the clear v cose supply line and the portion of the sleeve contai ing the orifices is enclosed in a chamber to which t striping viscose is continuously fed under the desir pressure.

The details of and the manner in which the inventi can be practiced will become more apparent from tl following description taken in consideration with t accompanying drawings illustrating a specific embo ment and forming a part of this specification and wherei Figure 1 is a section of an upward extrusion apparat for producing cellulosic tubing in combination wi means for applying the striping viscose, Figure 2 is a section taken on lines 2—2 of Figure Figure 3 is an enlarged section of one form of strip seamless cellulosic tubing, Figure 4 is a side elevation, partly diagrammatic a partly in section, of another apparatus for produci striped tubing.

Figure 5 is an enlarged section of a modified for of striped seamless cellulosic tubing of this invention.

Referring now to the drawings wherein like reference numerals designate like parts, the reference numeral 10 designates a viscose supply line which supplies clear viscose, under pressure, from a suitable source of supply, not shown, to an upward extrusion apparatus for producing seamless cellulosic tubing. As shown in Figure 1, supply line 10 is provided with a fitting including a sleeve 12 having a row of circumferentially spaced orifices 14 in the peripheral wall thereof. Each orifice 14 supplies striping viscose in the form of a stripe and the number of orifices 14 will depend on the number of stripes desired in the product. For convenience, four such orifices are shown in embodiment illustrated in Figure 3 of the drawings.

The fitting also includes a jacket 16 which cooperates with sleeve 12 to provide a chamber 18 to which striping viscose is supplied under pressure through an inlet 19 connected to a suitable source of supply, not shown. The striping viscose introduced in chamber 18 passes through orifices 14 to the flowing clear viscose mass and the resulting striped viscose is fed through line 10 to an upwardly extruding apparatus, which will now be described.

The extrusion apparatus is provided with an extrusion nozzle having a cup 20 and a core 22 disposed in spaced relationship to provide a tubular passage 24 terminating in an annular orifice 26 through which the striped viscose mass is extruded in the form of a seamless tubing 28. Cup 20 is seated on flange 30 of core 22 which flange is disposed on a suitable stationary support 32. Screws 34 secure cup 20 and core 22 to support 32.

The extrusion nozzle is disposed in reservoir 33 disposed on and secured to support 32 by screws 35 and to which coagulating and regenerating solution is continuously supplied through inlet 36. Outlet 38 maintains the level of the coagulating and regenerating solution in reservoir 33. By this construction, the striped viscose mass is extruded through annular orifices 26 directly into the coagulating and regenerating bath.

Coagulating and regenerating solution is supplied to the interior of the extruded casing 28 through passage 40 communicating with supply pipe 42 to the bottom of which solution is continuously fed from a suitable source of supply, not shown. Overflow drain pipe 44 disposed within supply pipe 42 maintains the level of the solution within tubing 28.

Tubing 28 is withdrawn from the bath and processed and dried as well known in the art to a flattened tubing from which cellulosic sausage casings are obtained.

As will be apparent from reference to Figure 1, the striped viscose mass upon introduction to the nozzle is converted into tubular form by passage 24 prior to extrusion through the annular orifice 26. As the tubular mass of striped viscose travels to the orifice 26, all stripes in the viscose mass, which are not disposed at 0° or 180° to a plane vertical to the center axis of the mass entering the nozzle will be angularly displaced. Thus, when a product is desired with two equidistantly spaced stripes, two orifices 14 can be located so as to apply the stripes at 0° and 180° in a plane vertical to the center axis of the viscose mass entering the nozzle. When more than two equidistantly spaced stripes are required in the product, orifices 14 must be spaced so as to compensate for the angular displacement of any stripes in its passage through the nozzle. For example, in the production of a cellulosic tubing 0.8 inch in diameter, having four equally spaced stripes, orifices 14 can be angularly arranged with respect to a plane vertical to the center axis of the viscose mass entering the nozzle and spaced as set out in Figure 2. For any specific setup and desired number of stripes, the aforesaid angular arrangement and spacing of the stripping viscose applying orifices 14 can be determined by simple empirical test.

To produce, for example, a casing 0.8 inch in diameter with four equidistantly spaced stripes, a clear viscose of the type employed for the production of cellulosic sausage casing is delivered under pressure normally used in the production of cellulosic tubing by the viscose process to supply line 10 provided with a tubular fitting in which sleeve 12 has four orifices 14, each being ⅛″ in diameter and spaced circumferentially as illustrated in Figure 2. A striping viscose composed of a viscose similar to the clear viscose but having 0.8% titanium dioxide homogeneously incorporated therein is delivered to chamber 18 of the fitting at a pressure 2 to 4 pounds higher than the pressure of the clear viscose and is forced through orifices 14 on and into the surface of the clear viscose mass passing thereby. The striped viscose mass then passes to and through the nozzle and is extruded as seamless tubing 28 into the coagulating bath, where it is coagulated and then regenerated, washed, softened, dried, and flattened in the usual manner.

As shown in Figure 3, the product consists of a seamless tubing formed of regenerated cellulose 50 and four equidistantly spaced opaque white stripes 52. Each stripe 52 consists of regenerated cellulose having titanium dioxide homogeneously incorporated therein. Due to the manner in which stripes 52 are made, there are no interfaces between them and the main body of the seamless tubing and stripes 52 do not appreciably penetrate into the mass and the opaquing component, such as the pigment, never comes in contact with the contents of the encased product. The face of exposed surfaces of the stripes 52 do not project from the surface but are smooth and of the same radius as the clear regenerated cellulose portions.

Casings obtained from the striped tubing herein described are admirably suitable for use in the preparation of skinless frankfurters. The stripes do not come in contact with the encased frankfurters nor interfere with the processing of the frankfurters therein, nor do they deleteriously affect the physical properties of the casing. Since the stripes and body of the casing are formed of similar viscoses, the permeability of the casing will be substantially uniform throughout. Smoke will penetrate and dyes when used will be absorbed substantially uniformly. Because of the stripes, a frankfurter from which the casing has not been peeled will be readily detected.

Stripes 52 in the casing have a matte appearance. When it is desired to make the entire exterior surface of the casing lustrous, the opaque stripes are embedded and completely surrounded by clear regenerated cellulose. This is accomplished by overlaying clear viscose on the opaque viscose stripes in the clear viscose mass prior to delivery of the viscose mass to the extrusion nozzle. The means for overlaying the opaque stripes with clear viscose is preferably a fitting similar in construction to the fitting which applies the opaque viscose, but in which the orifices in the sleeve are larger in diameter than those in the sleeve of the fitting applying the opaque viscose to assure complete overlay of the opaque viscose stripe. The clear viscose constituting the overlay is substantially the same as the clear viscose constituting the major portion of the mass fed to the extrusion nozzle and can be supplied to the fitting in the same maner in which the opaque viscose is supplied.

Referring now to Figure 4, the reference numeral 60 designates a viscose line which supplies the clear viscose under pressure from a suitable source of supply, not shown, to an upward extrusion nozzle, generally indicated by the reference numeral 62, and of a construction similar to that shown in Figure 1. Two fittings 64 and 64ª, similar in construction to the fitting shown in Figure 1, are inserted in line 60 to supply the opaque viscose and overlay clear viscose respectively to the viscose mass in line 60. Fitting 64 is provided with a sleeve 66 having a row of circumferentially spaced orifices 68 and arranged to compensate for angular displacement of the opaque viscose in its passage through the nozzle in the peripheral wall, and a jacket 70 which cooperates with sleeve 66 to provide a chamber 72 to which opaque viscose is supplied under pressure through inlet 74. Fitting 64ᵃ is similar in construction to fitting 64 and it includes sleeve 66ᵃ, row of circumferential spaced orifices 68ᵃ, jacket 70ᵃ, chamber 72ᵃ and inlet 74ᵃ. Sleeves 66 and 66ᵃ have the same number of orifices and they are similarly spaced so that the centers of corresponding orifices in both sleeves are at the same angular location with respect to a plane vertical to the center axis of the mass entering the nozzle. In order to assure the clear viscose applied by fitting 64ᵃ will completely overlay the opaque viscose stripe applied by fitting 64, orifices 68ᵃ are of diameters slightly larger than those of orifices 68.

The product obtained by the successive applications of striping opaque viscose and overlaying clear viscose, as just described, is as shown in Figure 5, characterized in that the stripes 78 are embedded in and completely surrounded by clear regenerated cellulose 80 without any interfaces. The entire outside surface of the seamless tubing possesses the luster characteristic of regenerated cellulose and the opaque stripes 78 are readily visible there through.

Sausage casings produced from seamless tubing having opaque stripes embedded and completely surrounded by clear regenerated cellulose have properties similar to those consisting solely of clear viscose.

The invention can be applied to cellulosic sausage casings having a wall thickness of from .0005 inch to 0.004 inch or more.

Though in the preferred form, the invention is applied to seamless tubing made of regenerated cellulose by the viscose process, it can also be applied to the production of seamless tubing made of other cellulosic materials, typical examples of which are cellulose ethers, such as ethyl cellulose, cellulose glycollate, cuprammonium cellulose, denitrated cellulose nitrate, deacetylated cellulose acetate, cellulose acetate, etc. It is, of course, understood that with any cellulosic material, the opaquing and overlaying compositions will contain the same base material as that which is to constitute the major portion of the product.

Since it is obvious that various changes and modifications may be made in the foregoing description without departing from the nature and spirit thereof, it is to be understood that the invention is not limited thereto, except as set out in the appended claims.

We claim:

1. In a method of producing striped artificial sausage casing, the steps which comprise continuously passing a stream of coagulable cellulosic mass through a passage, continuously incorporating at least one narrow stream of a striping composition in the surface of said mass as it passes through said passage, the base of said striping composition being compatible with said cellulosic mass and containing a material which imparts characteristics different and detectable from said mass, thereafter continuously passing the composite cellulosic mass through an annular passage to form a tubular stream, annularly extruding said tubular stream to form seamless tubing, and then coagulating and regenerating the coagulable cellulose in said tubing.

2. In a method as set forth in claim 1 wherein a plurality of narrow streams of the coagulable striping composition are incorporated in the surface of the mass at angles to a plane vertical to the center axis of the composite mass entering the annular passage to compensate for the angular displacement of said streams during passage through said annular passage.

3. A method as set forth in claim 1 where the coagulable cellulosic mass and the base of the striping composition are viscose.

4. In a method as set forth in claim 1 wherein the stream of the striping composition is at a higher pressure than the pressure of the coagulable cellulosic mass.

5. In a method of producing striped artificial sausage casing, the steps which comprise continuously passing a stream of coagulable cellulosic mass through a passage therefor, continuously incorporating at least one narrow stream of a coagulable striping composition in the surface of said mass as it passes through said passage, the base of said striping composition being similar to said cellulosic mass and containing a material which imparts characteristics different and detectable from said mass, overlying each of said narrow streams of striping composition in the cellulosic mass with a wider stream of a coagulable composition similar to the first named coagulable cellulosic mass thereafter passing the composite cellulosic mass through an annular passage to form a tubular stream, annularly extruding said tubular stream to form seamless tubing, and then coagulating and regenerating the coagulable cellulose in said tubing.

6. In a method as set forth in claim 5, wherein a plurality of narrow streams of the coagulable striping composition and respective overlays are incorporated in the surface of the cellulosic mass at angles to a plane vertical to the center axis of the composite mass entering the annular passage to compensate for the angular displacement of said streams and overlays during passage through said annular passage.

7. A method as set forth in claim 5 wherein the cellulosic mass, the base of the striping composition and the overlay composition are viscose.

8. An apparatus for producing striped artificial sausage casing comprising an extrusion nozzle having a tubular passage terminating in an annular orifice, a supply line through which the fluid mass is continuously fed to the tubular passage of the nozzle, and means in the supply line and spaced from said tubular passage to continuously incorporate at least one narrow stream of a striping composition in the surface of said fluid mass.

9. An apparatus as set forth in claim 8 wherein the means for incorporating the streams of the striping composition is a fitting inserted in the supply line and comprising a sleeve having a plurality of spaced orifices in the peripheral wall thereof, a jacket cooperating with said sleeve to provide a chamber communicating with said orifices, said jacket having an inlet whereby striping composition is supplied to said chamber.

10. An apparatus as set forth in claim 8 wherein the means for incorporating the streams of the striping composition is a fitting inserted in the supply line and comprising a sleeve having a plurality of orifices in the peripheral wall thereof and spaced at angles to a plane vertical to the center axis of the mass entering the nozzle to compensate for the angular displacement of the streams during passage through the nozzle.

11. A seamless regenerated cellulose sausage casing containing at least one extruded stripe of a regenerated cellulose having properties different and detectable from the mass and incorporated in the surface of the casing to indicate its presence on a sausage, said stripe being intimately united without interfaces to the regenerated cellulose of the casing, and said striped casing being uniformly penetrable by sausage curing smoke.

12. A seamless sausage casing as set out in claim 11 wherein the stripe is embedded in the surface of the product.

13. A seamless sausage casing as set out in claim 11 wherein the material constituting the stripe is visible.

14. A seamless sausage casing as set out in claim 11 wherein the stripe is overlayed with cellulosic material similar to the mass of the product.

15. A seamless clear cellulosic sausage casing containing at least one extruded stripe of pigmented regenerated cellulose incorporated in the surface of the casing to indicate the presence of a casing on a sausage, said stripe being intimately united without interfaces to the casing, and said striped casing being uniformly penetrable by sausage curing smoke.

16. A seamless sausage casing as set out in claim 15 wherein the stripe is overlayed with clear regenerated cellulose.

References Cited in the file of this patent

UNITED STATES PATENTS

| | | |
|---|---|---|
| 1,601,686 | Henderson | Sept. 28, 1926 |
| 2,141,776 | Vautier et al. | Dec. 27, 1938 |
| 2,191,829 | Johnson | Feb. 27, 1940 |
| 2,291,238 | Kimmick | July 28, 1942 |
| 2,747,223 | Cady | May 29, 1956 |
| 2,753,596 | Bailey | July 10, 1956 |
| 2,857,283 | Firth et al. | Oct. 21, 1958 |
| 2,860,052 | Firth et al. | Nov. 11, 1958 |